United States Patent
Böning et al.

(10) Patent No.: US 8,727,711 B2
(45) Date of Patent: May 20, 2014

(54) TURBOCHARGER WITH A VARIABLE TURBINE GEOMETRY VTG

(75) Inventors: Ralf Böning, Reiffelbach (DE); Dirk Frankenstein, Worms (DE); Holger Fäth, Fussgönheim (DE); Marc Hiller, Morschheim (DE)

(73) Assignee: Continental Automotive GmbH, Hannover (DE)

( * ) Notice: Subject to any disclaimer, the term of this patent is extended or adjusted under 35 U.S.C. 154(b) by 799 days.

(21) Appl. No.: 12/922,926

(22) PCT Filed: Mar. 12, 2009

(86) PCT No.: PCT/EP2009/052935
§ 371 (c)(1),
(2), (4) Date: Sep. 16, 2010

(87) PCT Pub. No.: WO2009/115451
PCT Pub. Date: Sep. 24, 2009

(65) Prior Publication Data
US 2011/0014033 A1    Jan. 20, 2011

(30) Foreign Application Priority Data
Mar. 18, 2008 (DE) .......................... 10 2008 014 678

(51) Int. Cl.
*F01B 25/02* (2006.01)
(52) U.S. Cl.
USPC .......................................... 415/164; 415/165
(58) Field of Classification Search
USPC .......... 415/148, 159, 160, 163, 164, 165, 200
See application file for complete search history.

(56) References Cited

U.S. PATENT DOCUMENTS

| | | | |
|---|---|---|---|
| 3,690,856 A * | 9/1972 | Bryan | 65/287 |
| 4,804,316 A * | 2/1989 | Fleury | 417/407 |
| 5,146,752 A * | 9/1992 | Bruestle | 60/602 |
| 6,145,313 A | 11/2000 | Arnold | |
| 6,543,994 B2 * | 4/2003 | Jinnai | 415/160 |
| 7,189,058 B2 | 3/2007 | Metz et al. | |
| 7,351,042 B2 | 4/2008 | Jinnai et al. | |
| 7,670,107 B2 | 3/2010 | Bartlelet et al. | |
| 2006/0034684 A1 | 2/2006 | Metz et al. | |
| 2007/0277525 A1 | 12/2007 | Stilgenbauer | |
| 2008/0240906 A1 | 10/2008 | Barthelet et al. | |
| 2010/0316489 A1 | 12/2010 | Hoecker et al. | |

FOREIGN PATENT DOCUMENTS

| | | |
|---|---|---|
| DE | 10311205 B3 | 9/2004 |
| DE | 10337491 A1 | 3/2005 |
| DE | 10337495 A1 | 3/2005 |
| DE | 102004023210 A1 | 12/2005 |
| DE | 102004023279 A1 | 12/2005 |
| DE | 102004037082 A1 | 3/2006 |
| DE | 102007056154 A1 | 5/2009 |
| EP | 0226444 A2 | 6/1987 |

(Continued)

*Primary Examiner* — Edward Look
*Assistant Examiner* — Jason Davis
(74) *Attorney, Agent, or Firm* — Laurence A. Greenberg; Werner H. Stemer; Ralph E. Locher (57) ABSTRACT

A turbocharger with a variable turbine geometry, includes at least one rolling body element respectively disposed on an associated fixing element for the variable turbine geometry. A device for adjusting the variable turbine geometry can roll off on the respective rolling body element.

19 Claims, 6 Drawing Sheets

(56) References Cited

FOREIGN PATENT DOCUMENTS

| EP | 1394363 | A1 | 3/2004 |
| EP | 1536103 | A1 | 6/2005 |
| WO | 2008118833 | A1 | 10/2008 |
| WO | 2009065763 | A2 | 5/2009 |

* cited by examiner

FIG. 6

TURBOCHARGER WITH A VARIABLE TURBINE GEOMETRY VTG

BACKGROUND OF THE INVENTION

Field of the Invention

The invention relates to a turbocharger with variable turbine geometry VTG, e.g. for a motor vehicle, and the mounting of the turbine geometry inside the turbocharger housing.

In the turbochargers known from the prior art, the turbine power is controlled by diverting part of the mass flow of exhaust gas around the turbine via a wastegate. However, only part of the exhaust gas mass flow is used.

In order to be able to use essentially the entire mass flow of exhaust gas, turbochargers are also known which have a variable turbine geometry VTG. Here, movable guide vanes are disposed around the turbine wheel which can be adjusted via an adjusting ring in order to vary the flow cross section of the turbine appropriately. Adapting the turbine cross section to the corresponding running condition of the engine can bring about a reduction in consumption and emissions, the rotatably mounted vanes between the scroll housing and the turbine wheel varying the boost behavior and therefore the power output of the turbine. This enables the entire exhaust gas energy to be utilized and the flow cross section of the turbine to be optimally set for every operating point.

The adjusting system of such a variable turbine geometry comprising an arrangement of rotating vanes generally consists of an adjusting ring which runs on rolling bodies. Vane levers engage in the adjusting ring and cause the vanes to swivel. In the prior art there are various shapes for the bearing arrangement of the adjusting ring, with three main variants having established themselves commercially. The first variant constitutes a pure journal bearing arrangement of the adjusting ring on the vane bearing ring. This variant is very difficult to tribologically tune, which means that expensive materials and large parts are required. The second variant relates to the mounting of the adjusting ring on a rolling body which is in turn mounted on a pin as an axis. Here sliding is only provided between the pin and the rolling body. The slideways are therefore much smaller than in the first mentioned bearing arrangement of the adjusting ring. The tribology is easier to adjust and with smaller parts. The third variant relates to a pure anti-friction bearing arrangement with rolling bodies which are positioned via a cage and which roll inside the outer ring, which can be the adjusting ring, and on the vane bearing ring.

BRIEF SUMMARY OF THE INVENTION

The object of the present invention is therefore to provide a turbocharger with simplified mounting for a variable turbine geometry.

This object is achieved by a turbocharger having the features set forth below.

Accordingly there is provided according to the invention a turbocharger with a variable turbine geometry, said turbocharger having:

at least one or a plurality of rolling body elements each disposed on an associated fixing element of the variable turbine geometry, wherein an adjusting device for the variable turbine geometry can roll on the respective rolling body element.

The turbocharger has the advantage here that manufacturing costs can be reduced by providing a rolling body element on its own fixing element of the variable turbine geometry. In addition, assembly can also be simplified due to the fact that the rolling body element does not have to be specially fixed on an additional separate pin, but can be provided directly on a fixing element of the variable turbine geometry. At least one such rolling body element or any number of rolling body elements can be provided, each disposed on an associated fixing element such that the adjusting device, e.g. an adjusting ring element, can roll on the respective rolling body element.

Advantageous embodiments and developments of the invention will emerge from the sub-claims and the description with reference to the accompanying drawings.

In an inventive embodiment, the rolling body element is rotatably disposed on a shank of the associated fixing element. Said rolling body element is designed and disposed such that the adjusting device, e.g. in the form of an adjusting ring element, can roll on the rolling body element, e.g. on the outside of the rolling body element. The advantage of this is that no special pin needs to be provided on which the rolling body element is rotatably disposed. Instead, the fixing element for the variable turbine geometry can be used.

In another inventive embodiment, the variable turbine geometry has, for example, two vane bearing rings with a spacer disposed therebetween. In addition, the variable turbine geometry incorporates the respective rolling body element and optionally a spacing element in which the associated rolling body element is accommodated. The receptacle in the spacing element is designed such that part of the rolling body element is accommodated, rolling of the adjusting device on the rolling body element being ensured. The spacing element has the advantage that, on the one hand, it enables the distance of the vane bearing rings from the turbocharger housing to be adjusted and, on the other, enables the rolling body element to be accommodated.

In another inventive embodiment, the shank of the fixing element is made thinner or narrower in the area of the opening of the first vane bearing ring, the second vane bearing ring, the spacer, the spacing element and/or the rolling body element. Here the diameter or variation in diameter of the shank can be selected, for example, such that stresses occurring in the shank can be as evenly distributed as possible. In addition, the diameter or variation in diameter of the shank can be selected, for example, such that the occurrence of shear stresses in the shank is essentially prevented or at least reduced if, for example, parts such as the vane bearing ring and its spacer undergo severe heating because of the hot exhaust gas mass flow.

According to another inventive embodiment, the shank of the fixing element has, for example, a section for adjusting the respective part, e.g. a projection or the like, in the area of the opening of the first vane bearing ring, the second vane bearing ring, the spacer and/or the spacing element.

BRIEF DESCRIPTION OF THE SEVERAL VIEWS OF THE DRAWING

The invention will now be explained in greater detail with reference to the exemplary embodiments schematically illustrated in the accompanying drawings in which.

DESCRIPTION OF THE INVENTION

Unless otherwise stated, the same or rather functionally identical elements and devices are provided with the same reference characters.

Figure 1:
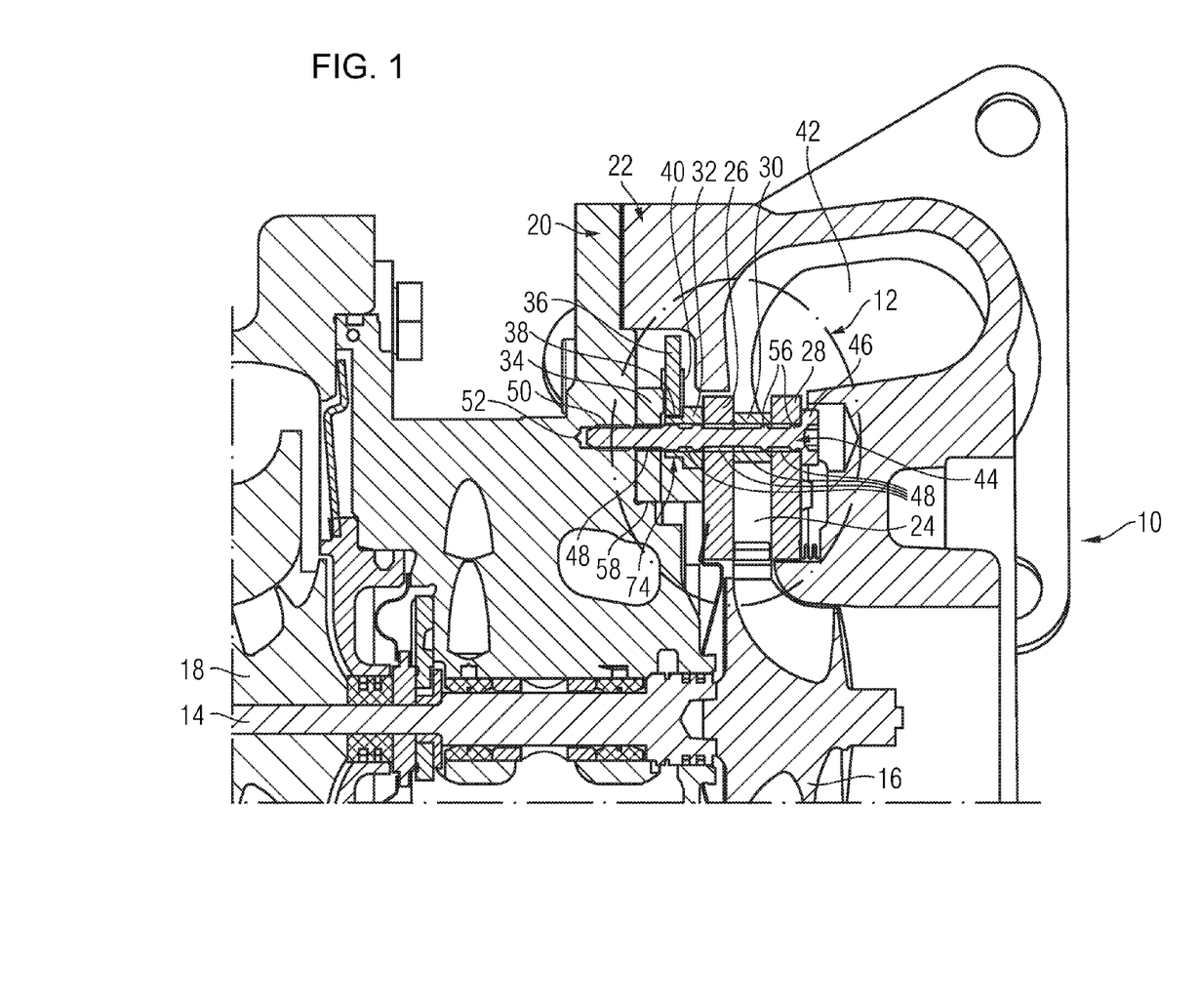
FIG. 1 shows a sectional view of a turbocharger with a variable turbine geometry VTG according to a first embodiment of the invention.

FIG. 1 firstly shows a sectional view of a turbocharger 10 with a variable turbine geometry, according to a first embodiment of the invention. The shaft 14 of the turbocharger 10 is shown on which are disposed a turbine wheel 16 and a compressor wheel 18. The shaft 14 is mounted in a bearing housing 20 which is connected on one side to a turbine housing 22 in which the turbine wheel 16 is disposed. To set or vary the flow cross section of the turbine, there is provided a variable turbine geometry VTG arrangement 12 having movable or more specifically rotating vanes 24.

As shown in FIG. 1, the variable turbine geometry arrangement 12 has, for example, a first and second vane bearing ring 26, 28 between which movable i.e. rotating vanes 24 are disposed. Between the two vane bearing rings 26, 28 there is additionally disposed a spacing sleeve 30 to set the distance between the two vane bearing rings 26, 28. Disposed in contact with the first vane bearing ring 26, 28 is a rolling body element 32 which is partly accommodated in a spacing element 34. An adjusting ring element 36 is additionally provided which can roll e.g. on the outside 38 of the rolling body element 32. The vanes 24 are provided with a lever element device 40 which has e.g. for each vane 24 a lever element which is coupled to the adjusting ring element 36. By rotating the adjusting ring element 36, the lever element device 40 coupled thereto can be moved and the vanes 24 can be moved or rather rotated accordingly to set the flow cross section of the turbine appropriately. For this purpose the vanes 24 are disposed between the flow housing 42 and the turbine, as shown in FIG. 1.

According to the first inventive embodiment, parts of the variable turbine geometry VTG arrangement 12, i.e. the two vane bearing rings 26, 28, the spacing sleeve 30 provided therebetween, the rolling body element 32 and the spacing element 34, for example, are fastened to the turbocharger housing by a fixing element 44. To be more precise, these parts are bolted e.g. to the bearing housing 20 via the fixing element 44. According to the first embodiment, a bolt 46 or more precisely a fixing bolt is used as a fixing element 44, as shown in FIG. 1.

In contrast to the prior art as described in the introduction, the rolling body or rather here the rolling body element 32 is not mounted separately on a separate pin, but on a fixing element 44, here a fixing bolt 46, of the variable turbine geometry arrangement 12, the two vane bearing rings 26, 28, the spacing sleeve 30, the rolling body element 32 and the spacing element 34 having corresponding openings 48 through which the fixing element 44 is inserted before it is then, for example, permanently bolted to the bearing housing 20. For this purpose the fixing element 44 has at one end a corresponding threaded section 50 with which it is bolted into an associated bore hole 52 in the bearing housing 20.

In addition, in the area of the vane bearing rings 26, 28 and the spacing sleeve 30, for example, the shank 54 of the fixing element 44 can be made thinner than their openings 48 in each case. This makes it possible, for example, to avoid or at least reduce shear stresses which can be produced if e.g. the vane bearing rings 26, 28 and the spacing sleeve 30 disposed therebetween expand more strongly under the effect of the hot exhaust gas flow. On its shank 54, the fixing element 44 can optionally have a projection 56, e.g. a circumferential projection, in the area of the first and/or second vane bearing ring 26, 28 and the spacing sleeve 30 in order to adjust the vane bearing rings 26, 28 and the spacing sleeve 30.

The shank 54 of the fixing element 44 can, for example, be designed such that stresses can be distributed as evenly as possible over the shank 54. Basically, however, the invention is not limited to the above described bolt shank 54. The shank 54 can, for example, be implemented in any shape or dimensions, provided that the rolling body element 32 can be disposed thereon and the bolt 46 can be used for fixing the variable turbine geometry arrangement 12. This applies to all the embodiments of the invention, particularly also to the stud bolt with nut described below.

The rolling body element 32 is implemented, for example, such that it can be rotated around the fixing element 44 or more specifically the shank 54 of the bolt 46. The other parts, on the other hand, i.e. the two vane bearing rings 26, 28, the spacing sleeve 30 and the spacing element 34, are fixed, i.e. essentially do not rotate around the fixing element 44. The adjusting ring element 36 is disposed on the outside 38 of the rolling body element 32. Here the adjusting ring element 36 can roll on the rolling body element 32, said rolling body element 32 being able to rotate, for example, around the shank 54 of the fixing element 44 as described above.

Figure 2:
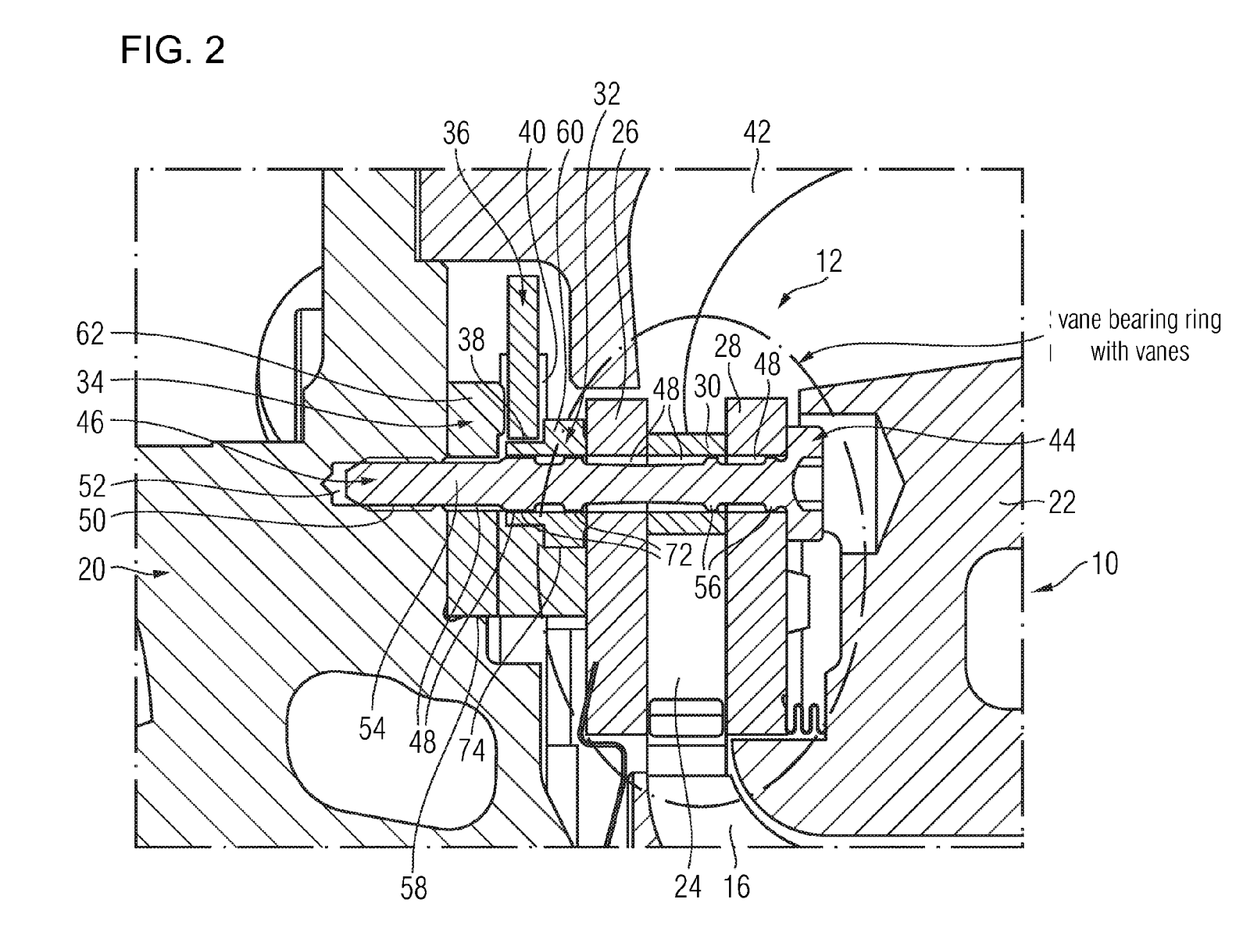
FIG. 2 shows an enlarged detail of the fixing of the variable turbine geometry VTG according to FIG. 1.

FIG. 2 shows an enlarged detail of the mounting of the variable turbine geometry VTG according to FIG. 1. As described above, the fixing element 44 is, for example, a fixing bolt 46 which lies with its head against the second vane bearing ring 28 and clamps the parts to the bearing housing 20.

In this case, as shown in FIGS. 1 and 2, the spacing element 34 abuts a shoulder 58 of the bearing housing 20. The diameter of the bolt shank 54 is made smaller, for example, in the area of the opening 48 of the spacing element 34. Basically, however, the shank 54 can also rest against the opening 48, at least in a section thereof, in order to additionally center the spacing element 34. In addition, the rolling body element 32 and/or the spacing element 34 can optionally have a shoulder 60, 62. As shown in FIG. 2, the adjusting ring element 36 is disposed between said two shoulders 60, 62, thereby preventing, for example, the adjusting ring element 36 from being unintentionally displaced in the axial direction.

Figure 3:
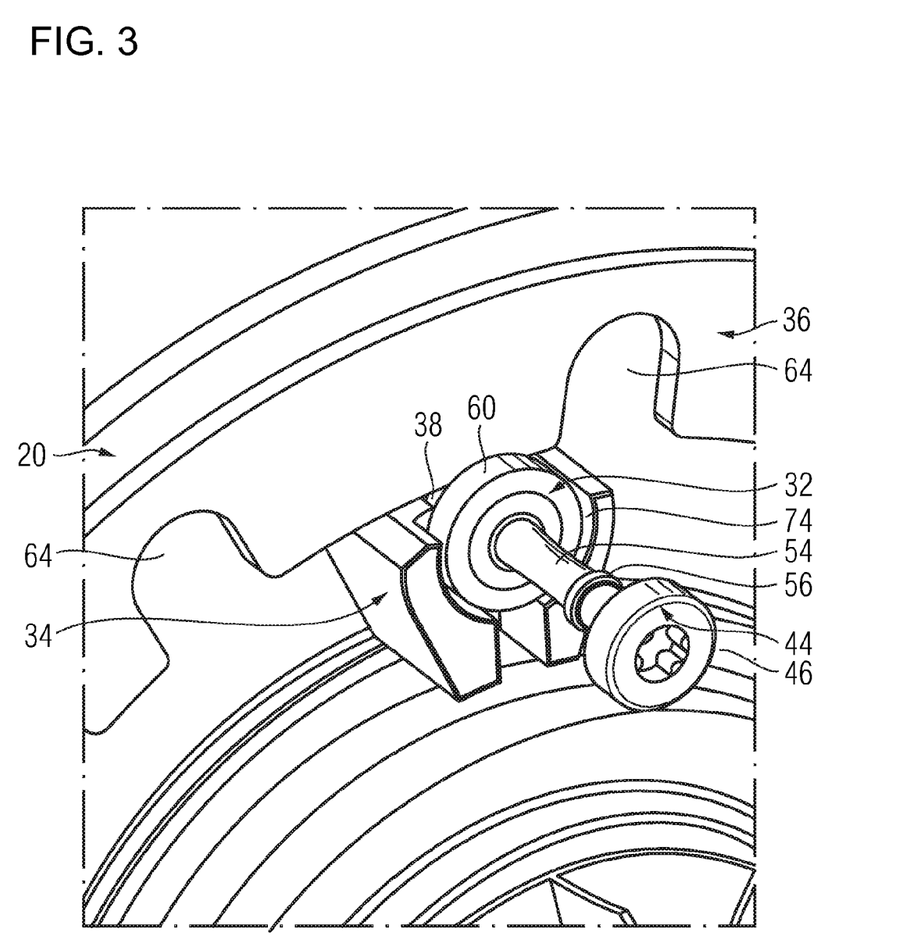
FIG. 3 shows a perspective view of a bearing housing of the turbocharger and part of the fixing of the variable turbine geometry according to FIGS. 1 and 2.

In addition, FIG. 3 shows a perspective view of a detail of the bearing housing 20, as well as of the fixing element 44, the rolling body element 32, the spacing element 34 and the adjusting ring element 36. For reasons of clarity, the two vane bearing rings, the spacing sleeve and the vanes, as well as the lever element device and other elements have not been shown.

As shown in FIG. 3, the adjusting ring element 36 can roll on the outside 38 of the rolling body element 32, said rolling body element 32 being able to rotate around the shank 54 of the fixing element 44. To adjust or more precisely rotate the vanes 24, the adjusting ring element 36 has, for example, corresponding cutouts 64. The adjusting ring element 36 can accommodate a corresponding lever element of the lever element device 40 in a respective cutout 64. When the adjusting ring element 36 is actuated or more specifically rotated via an associated actuator (not shown), in doing so it also rotates the lever elements and the vanes 24 connected thereto, thereby enabling the vanes 24 to be rotated to a desired position in order to set a predefined flow cross section of the turbine.

Figure 4:
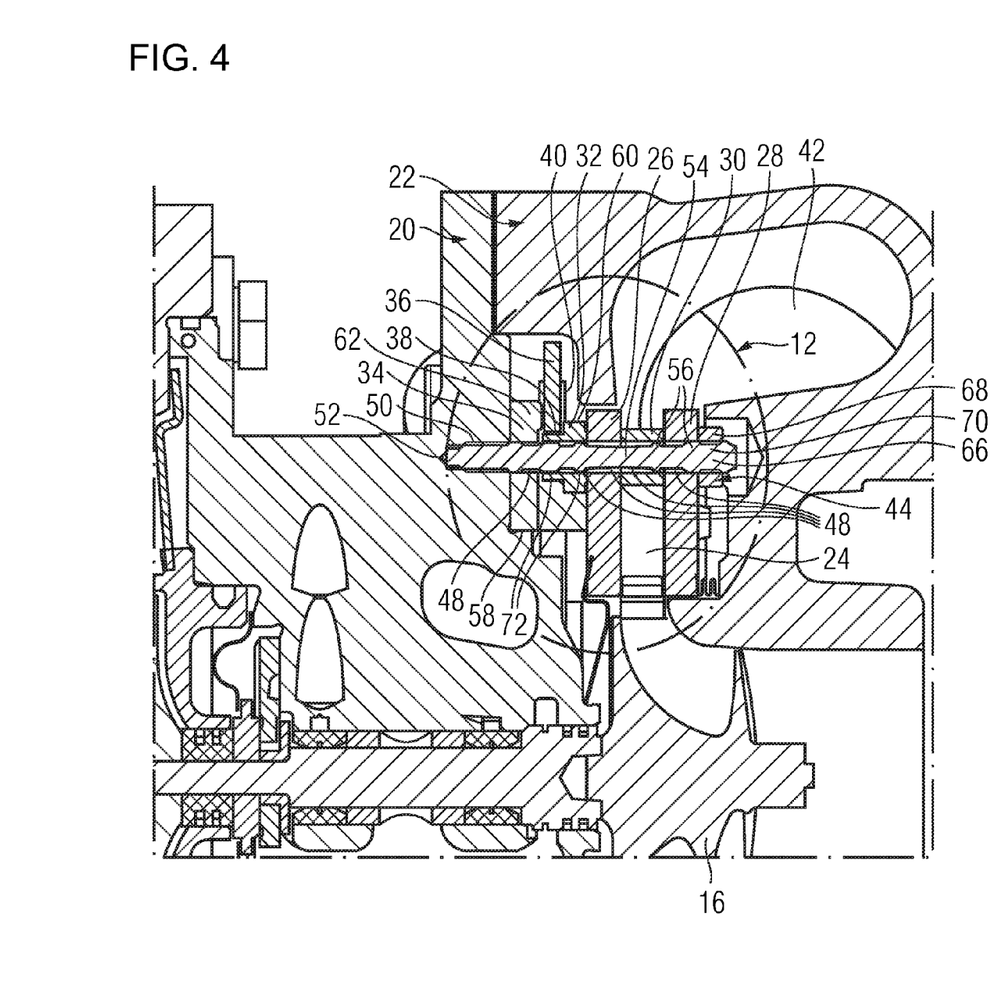
FIG. 4 shows a sectional view of a turbocharger with a variable turbine geometry VTG according to a second embodiment of the invention.
Figure 5:
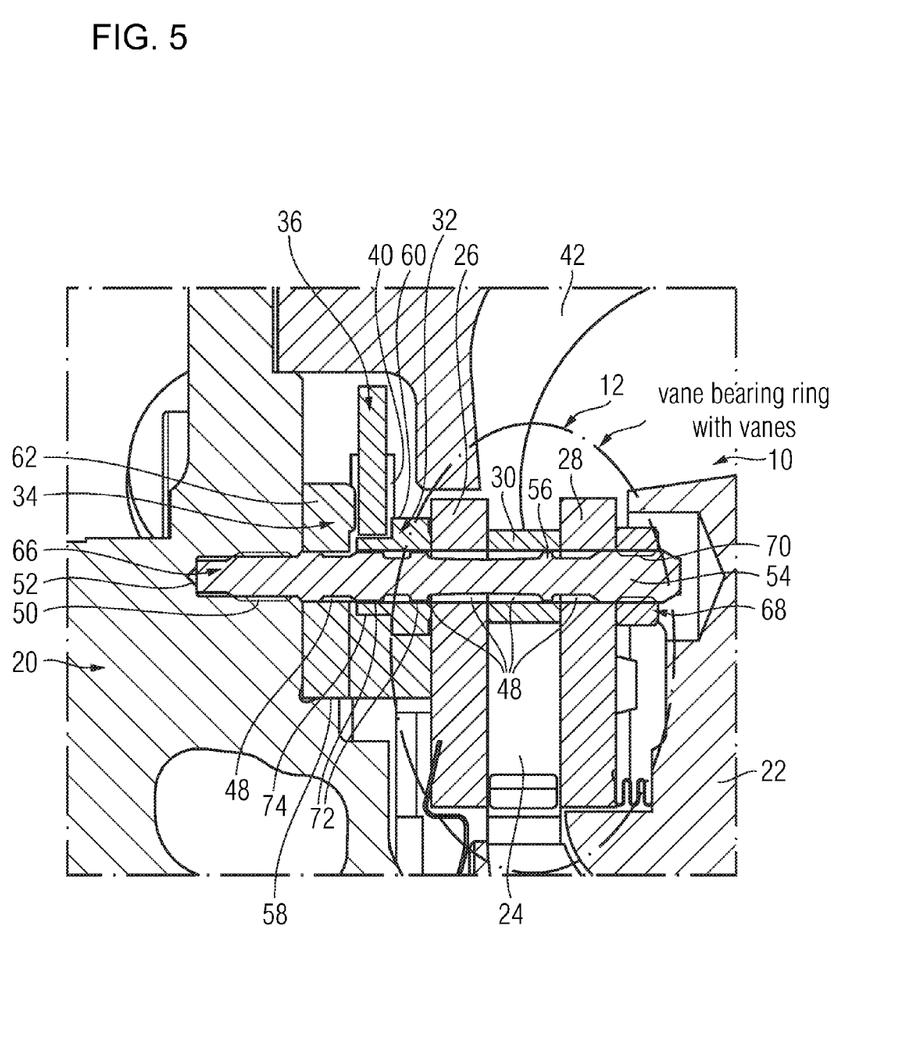
FIG. 5 shows an enlarged detail of the fixing of the variable turbine geometry according to FIG. 4.
Figure 6:
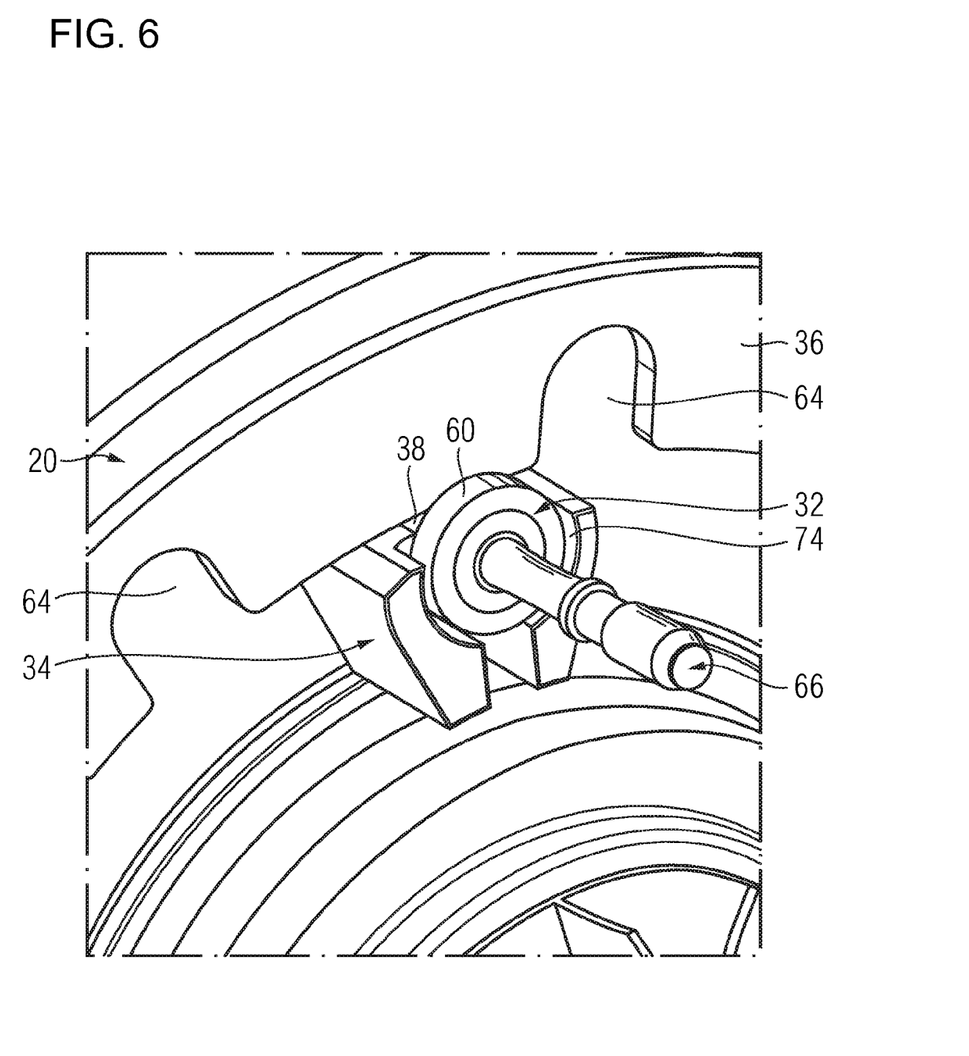
FIG. 6 shows a perspective view of a bearing housing of the turbocharger and part of the fixing of the variable turbine geometry according to FIGS. 4 and 5.

FIGS. 4, 5 and 6 show a second inventive embodiment of a turbocharger 10 having a variable turbine geometry VTG arrangement 12. The essential difference between this second embodiment and the first embodiment is that the fixing element 44 consists of a stud bolt 66 with a nut 68 at the outer end, whereas the fixing element 44 according to the first embodiment consists of a headed bolt 46. The above statements relating to the first embodiment also essentially apply mutatis mutandis to the second embodiment and vice versa.

FIG. 4 shows a section view of a turbocharger 10 with a variable turbine geometry arrangement 12, according to the second embodiment of the invention. Here, as in the first embodiment, a variable turbine geometry is provided which has, for example, a first and second vane bearing ring 26, 28 between which movable or more specifically rotatable vanes 24 are disposed.

Between the two vane bearing rings 26, 28, a spacing sleeve 30 can be provided via which the distance between the two vane bearing rings 26, 28 can be set. A lever element device 40 is additionally provided via which the vanes 24 can be moved or more specifically rotated. In addition, a rolling body element 32 is provided which is partly accommodated in a spacing element 34. Between the spacing element 34 and the rolling body element 32, an adjusting ring element 36 can be provided for adjusting or more specifically rotating the vanes 24 so that a desired turbine cross section can be set. For this purpose the rolling body element 32 and the spacing element 34 can have, respectively, a shoulder and a projection 60, 62 between which the adjusting ring element 36 is disposed.

In contrast to the first embodiment, the parts of the variable turbine geometry 12, such as, for example, the two vane bearing rings 26, 28, the spacing sleeve 30, the rolling body element 32 and the spacing element 34, are fixed or more specifically bolted to the bearing housing 20 via a fixing element 44 in the form of a stud bolt 66 with a nut 68.

For this purpose, one end of the stud bolt 66 has a threaded section 50 with which it is bolted into an associated bore hole 52 in the bearing housing 20. At the other end, the stud bolt 66 likewise has a threaded section 50 where the nut 68 is fastened in order to fix the parts of the variable turbine geometry 12 to the bearing housing 20. Like the bolt 56 in the first embodiment, in the area of the vane bearing rings 26, 28 and the spacing sleeve 30, the stud bolt, i.e. pin element 66, is e.g. made thinner than their openings 48. This enables, for example, shear stresses to be avoided or at least reduced if the parts expand excessively under the effect of the hot exhaust gas flow.

In addition, the stud bolt 66 can have, on its shank 54, a projection 56, for example, in the area of the first and/or second vane bearing ring 26, 28 and the spacing sleeve 30 in order to adjust the vane bearing rings 26, 28 and the spacing sleeve 30. Alternatively, instead of the projection 56 the outer section 70 of the stud bolt 66 can be lengthened, as shown in FIG. 4. Part of the outer section 70 is provided with a thread in order to screw on the nut 68, whereas the other part, for example, has no thread and projects into the opening 48 of vane bearing ring 28 in order to center the latter. Instead of this, the threaded section can basically also be lengthened and extend into the opening 48 of the vane bearing ring 28.

FIG. 5 shows an enlarged detail of the mounting of the variable turbine geometry VTG according to FIG. 4. The rolling body element 32 is, for example, implemented such that it can rotate around the fixing element 44. The other parts, i.e. the two vane bearing rings 26, 28, the spacing sleeve 30 and the spacing element 34, on the other hand, are fixed or, more specifically, essentially do not rotate around the shank 54 of the stud bolt 66. The adjusting ring element 36 is disposed on the outside 38 of the rolling body element 32. Said adjusting ring element 36 can roll on the rolling body element 32, said rolling body element 32 being able to rotate around the shank 54 of the stud bolt 66, for example, as described above.

FIG. 6 additionally shows a perspective view of a detail of the bearing housing 20, and of the fixing element 44, the rolling body element 32, the spacing element 34 and the adjusting ring element 36. If the adjusting ring element 36 is rotated to turn the vanes 24, it can roll on the outside 38 of the rolling body element 32. Here the rolling body element 32 can be rotatably implemented around the shank 54 of the stud bolt 66, for example. As shown in FIG. 5, the shank 54 of the stud bolt 66 has, for example, two bearing surfaces 72 for the rolling bearing element 32 around which the rolling bearing element 32 can rotate.

In order to rotate the vanes 24 of the variable turbine geometry arrangement 12 to a predetermined position in order to set the flow cross section of the turbine appropriately, the adjusting ring element 36 typically has corresponding cutouts 64. Said adjusting ring element 36 can accommodate a corresponding lever element of the lever element device 40 in a respective cutout 64. When, as described above, the adjusting ring element 36 is rotated, it also moves the respective lever element and with it the associated vane 24. The adjusting ring element 36 is here rotated via a suitable actuator (not shown).

As in the first embodiment, in the second embodiment the spacing element 34 also has a corresponding mounting 74 for the rolling body element 32, an area of the rolling body element 32 on which the adjusting ring element 36 can roll being left free, for example.

As the rolling body element 32 no longer runs on a separate pin, but on a fixing element 44 of the variable turbine geometry VTG arrangement 12 instead, the manufacturing costs can be reduced, while at the same time achieving at least the same functionality.

This can also be assisted by the material or the material combination which is used for the bolted connections because of the operating temperature being comparable or similar to the material or material combination of which the pins 66 constituting the axis e.g. of the second inventive embodiment are made.

For example, nickel-based high-temperature low-creep superalloys, such as, NIMONIC 80, 90, 100, 110, etc. and other high-temperature resistant bolt materials such as 2.4952, 1.4980 etc. to mention only a few other examples of high-temperature resistant materials can be used as materials for the fixing element 44, i.e. the fixing bolt or the stud bolt.

The rolling body element 32 can be e.g. a turned part of a corresponding temperature-resistant metal or metal alloy or also a sintered part, etc. In addition, the rolling body element 32 can also be made of a material combination which is correspondingly temperature-resistant while at the same time allowing rotation of the rolling body element 32 on the fixing element 44 and rolling of the adjusting ring element 36.

Although the present invention has been described above with reference to the preferred embodiments, it is not restricted thereto but modifiable in a variety of ways, the above described embodiments being combinable with one another, particularly individual features thereof.

In particular, the invention is not limited to a combination and arrangement or implementation of the elements 26, 28, 30, 32, 34, 36 as shown in FIGS. 1-6. The crucial point is that the rolling body element 32 is disposed on a fixing element 44 for a variable turbine geometry 12 instead of on a separate pin, whereby an adjusting device such as an adjusting ring element 36 can roll on the rolling body element 32. For example, instead of a spacing element 34 or in addition thereto, the first vane bearing ring 26 can be provided with a receptacle for the rolling body element 32. The spacing element 34 can be e.g. merely provided to set a distance of the rolling body element 32 and the other parts 26, 28, 30 of the variable turbine geometry from the bearing housing 20. In addition, the invention can be applied to a large number of variable turbine geometry designs. The invention is not limited to a design consisting of two vane bearing rings 26, 28 with a spacing sleeve 30 therebetween and vanes which are actuated via the adjusting ring element 36 and a lever element device 40 connected thereto.

The invention claimed is:

1. A turbocharger, comprising:
   a variable turbine geometry;
   at least one fixing element of said variable turbine geometry;
   at least one rolling body element each disposed on a respective said fixing element;
   an adjusting device of said variable turbine geometry configured to roll off on said at least one rolling body element; and
   a turbocharger housing, said at least one fixing element fastening said variable turbine geometry to said turbocharger housing.

2. The turbocharger according to claim 1, wherein said at least one fixing element has a shank, said at least one rolling body element has an outside, said at least one rolling body element is rotatably disposed on said shank, and said adjusting device is configured to roll off on said outside of said at least one rolling body element.

3. The turbocharger according to claim 2, wherein said adjusting device is an adjusting ring element configured to roll off on said outside of said at least one rolling body element.

4. The turbocharger according to claim 1, wherein said turbocharger housing is a bearing housing of the turbocharger.

5. The turbocharger according to claim 1, which further comprises:
   said variable turbine geometry having vane bearing rings and at least one spacer disposed between each respective two said vane bearing rings; and
   said at least one rolling body element, said vane bearing rings and said at least one spacer each having an opening formed therein through which a respective said at least one fixing element can be extended for fixation at an end to said turbocharger housing.

6. The turbocharger according to claim 5, which further comprises at least one spacing element each accommodating a respective said at least one rolling body element and having said opening formed therein, said vane bearing rings being two vane bearing rings each having said opening formed therein.

7. The turbocharger according to claim 6, wherein said at least one spacing element has a receptacle in which said at least one rolling body element is partly accommodated.

8. The turbocharger according to claim 7, which further comprises two shoulders of said at least one spacing element and/or said at least one rolling body element, said adjusting device being configured to be disposed between said two shoulders.

9. The turbocharger according to claim 6, wherein said shank of said at least one fixing element is thinner or narrower than a remainder of said at least one fixing element.

10. The turbocharger according to claim 9, wherein said two vane bearing rings are first and second vane bearing rings, and said at least one fixing element is thinner or narrower in vicinity of said opening in said first vane bearing ring, said second vane bearing ring, said at least one spacer, said at least one spacing element and/or said at least one rolling body element.

11. The turbocharger according to claim 6, wherein said two vane bearing rings are first and second vane bearing rings, said at least one fixing element has a shank with a projection for adjustment in vicinity of said opening in said first vane bearing ring, said second vane bearing ring, said at least one spacer and/or said at least one spacing element.

12. The turbocharger according to claim 1, wherein said at least one fixing element including a shank having an end with a threaded section for bolting said at least one fixing element to said turbocharger housing.

13. The turbocharger according to claim 1, wherein said turbocharger housing has a shoulder, and at least one spacing element disposed on said shoulder of said turbocharger housing.

14. The turbocharger according to claim 1, wherein said at least one fixing element has a shank with one or two bearing surfaces around which said at least one rolling body element is rotatably disposed.

15. The turbocharger according to claim 1, wherein said at least one fixing element is a headed bolt or a stud bolt with a nut.

16. The turbocharger according to claim 1, wherein said at least one fixing element has a high-temperature resistant material or material combination or is manufactured therefrom.

17. The turbocharger according to claim 16, wherein said at least one fixing element is manufactured from bolt materials 2.4952 or 1.4980.

18. The turbocharger according to claim 1, wherein said at least one rolling body element is a turned part or a sintered part.

19. The turbocharger according to claim 18, wherein said at least one rolling body element is made of a high-temperature resistant material or material combination.

* * * * *